Jan. 20, 1970   J. U. MESSENGER   3,490,535
FORMATION OF PLUGS WITHIN WELLS
Filed June 17, 1968                     2 Sheets-Sheet 1
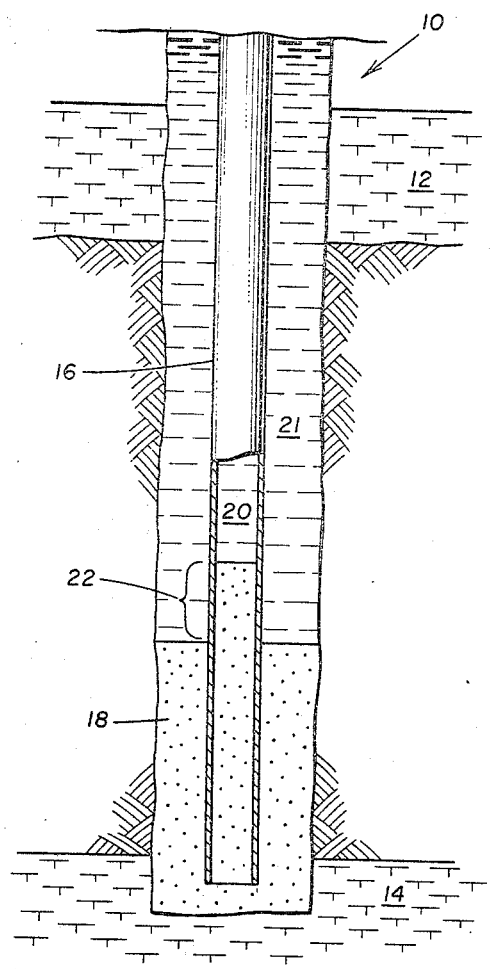
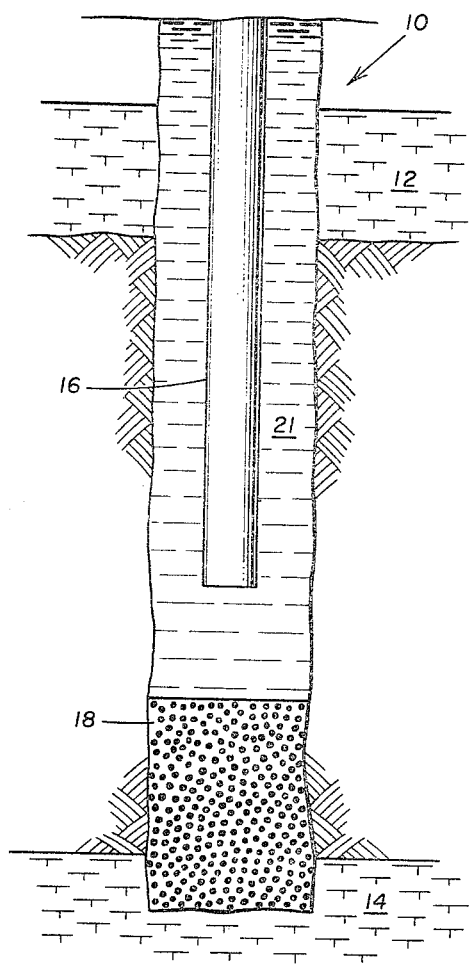
JOSEPH U. MESSENGER
INVENTOR
BY *William D. Jackson*
ATTORNEY Jan. 20, 1970  J. U. MESSENGER  3,490,535
FORMATION OF PLUGS WITHIN WELLS
Filed June 17, 1968  2 Sheets-Sheet 2

JOSEPH U. MESSENGER
INVENTOR

BY *William N. Jackson*
ATTORNEY

United States Patent Office 3,490,535
Patented Jan. 20, 1970

3,490,535
FORMATION OF PLUGS WITHIN WELLS
Joseph U. Messenger, Dallas, Tex., assignor to Mobil Oil Corporation, a corporation of New York
Filed June 17, 1968, Ser. No. 737,527
Int. Cl. E21b, 33/13
U.S. Cl. 166—292                                                    16 Claims

ABSTRACT OF THE DISCLOSURE

This specification discloses a method of placing a plug within a well. An aqueous suspension of a weighting agent containing a water-soluble complex phosphate thinning agent in an amount within the range of 0.2 to 0.9 pound per barrel of water and exhibiting a pH within the range of 6 to 11 is circulated down a drill string within the well and into the wellbore externally of the drill string. Thereafter, the drill string is withdrawn and the suspension is allowed to form the plug which is resistant to high pressure differentials thereacross.

BACKGROUND OF THE INVENTION

This invention relates to the drilling of wells into the earth's crust and, more particularly, to a new and improved method of positioning a plug within such well during drilling operations.

Typically, wells are drilled into the earth's crust to desired subterranean locations, e.g., oil- and/or gas-bearing formations, through the application of rotary drilling techniques. In the rotary drilling of a well a drilling fluid is circulated through the well in order to remove the cuttings therefrom. The drilling fluid may be gaseous or liquid, though in most rotary drilling procedures the drilling fluid comprises a liquid, usually a water base medium, which contains solids suspended therein. The solids which are utilized in such drilling fluids, or "muds" as they are commonly termed, typically take the form of clays of the kaolinite, montmorillonite, or illite groups. Such clays are utilized to impart desirable thixotropic properties to the drilling mud and also serve to coat the walls of the well with a relatively impermeable sheath, commonly termed a "filter cake," which retards the loss of fluid from the well into the formations penetrated by the well. In addition to the various clays such as mentioned above, a drilling fluid may also contain one or more weighting agents which function to increase the density of the fluid as necessary to offset the formation pressures encountered during the drilling operation. Conventional weighting agents are heavy minerals such as barite (barium sulfate) and galena (lead sulfide).

During the drilling of a well it may be desirable to form a plug therein to temporarily seal off the lower portion of the well from the remainder of the well. For example, when an unusually high pressure formation, commonly termed an "active zone," is encountered it may be necessary in order to offset the high pressure of the active zone, to employ a drilling mud of such high weight that a formation above the active zone is fractured. This fractured zone then becomes a "loss zone" into which mud flows at such a high rate that "lost circulation" occurs. The lost circulation may be so severe that it ultimately becomes impossible to maintain a column of mud above the active zone sufficient to impart the necessary hydrostatic head thereon to offset the high pressures within the active zone. As this occurs, the well becomes increasingly susceptible to a blow-out into the loss zone or to the surface.

In a situation such as described above, it becomes desirable to place a plug between the active zone and the loss zone such that remedial steps may be taken to prevent the lost circulation without fear the well blowing out. For example, if the active zone can be sealed off from the loss zone, then casing may be set and cemented through the loss zone such that suitably heavy muds may thereafter be employed during the drilling operation.

Another instance where a plug may be desirable is in conjunction with the making of a "trip," i.e., the withdrawal of the drill string from the well in order to change the drill bit. During the trip the well may be inadvertently swabbed as the drill string is withdrawn, with the attendant result that the hydrostatic head on the bottom of the hole is suddenly lowered. In such cases, it may be desirable before starting the trip to place a plug near the bottom of the hole such that should a swabbing action take place the possibility of a well blow-out will be greatly reduced.

SUMMARY OF THE INVENTION

In accordance with the present invention there is provided a new and improved method of placing a plug within a well which will seal the bottom of the well against high pressure gradients and yet which may be easily removed when it is desired to resume drilling operations. The invention is practiced in conjunction with a conventional drilling procedure in which a drilling fluid is introduced into a drill string within the well and then circulated from the drill string into the wellbore exteriorly of the drill string and upwardly through the well annulus surrounding the drill string. In carrying out the invention an aqueous suspension of a weighting agent is introduced into the drill string. The aqueous suspension contains a water-soluble complex phosphate thinning agent in an amount within the range of 0.2 to 0.9 pound per barrel of water in the suspension and exhibits a pH within the range of 6 to 11. The aqueous suspension is circulated down the drill string and into the wellbore externally of the drill string and, after placement of the aqueous suspension within the well, the drill string is withdrawn to at least above the top of the aqueous suspension. The aqueous suspension forms a solid plug by settling and/or dehydration which is resistant to extremely high pressure differentials thereacross.

In a preferred embodiment of the invention the weighting agent utilized is barite and the aqueous medium utilized in forming the aqueous suspension is relatively fresh water having a dissolved salts content of not more than 2,000 parts per million. The barite desirably is added to the aqueous medium in an amount such that the density of the resulting suspension is within the range of about 18 to 24 pounds per gallon.

BRIEF DESCRIPTION OF THE DRAWINGS

FIGURE 1 is a schematic illustration of a well, partly in cross-section, showing the aqueous plugging suspension in place within the wellbore immediately before withdrawing the drill string;

FIGURE 2 is a schematic illustration of a well, partly in section, showing the position of the drill string after it is withdrawn from the plug;

DESCRIPTION OF SPECIFIC EMBODIMENTS

Figure 4:
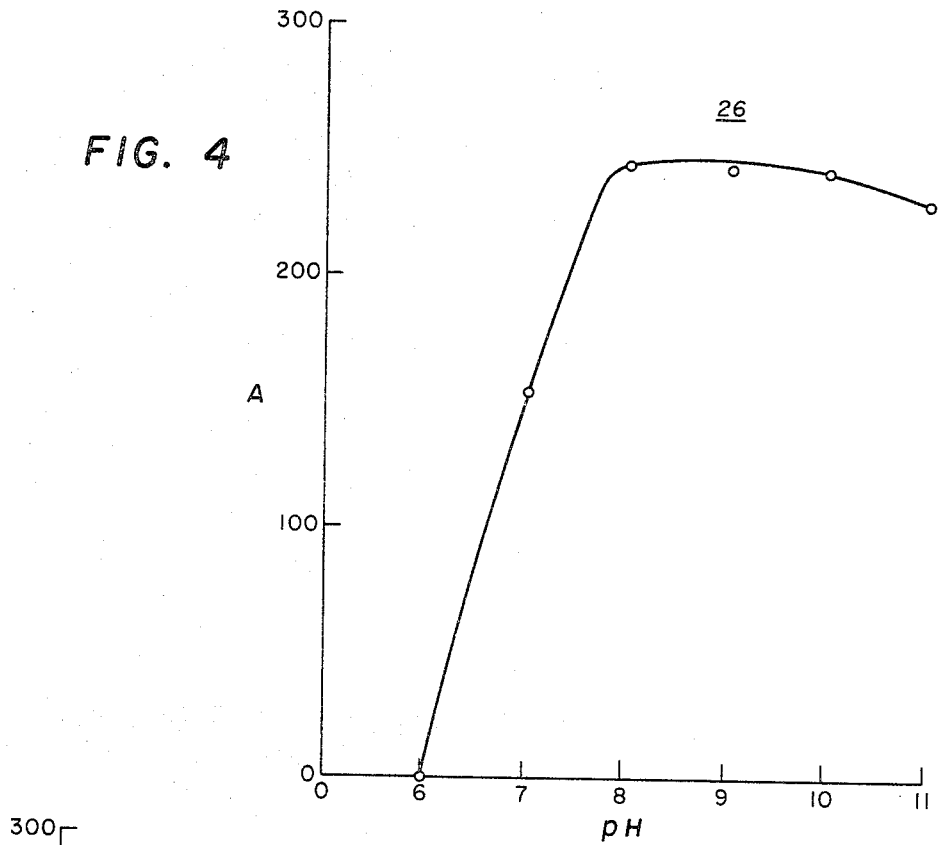
FIGURE 4 is a graph illustrating the effect of pH on the tendency of the weighting agent to settle from the aqueous suspension.

The weighting agent utilized in carrying out the present invention may be any material suitable for weighting drilling muds. The weighting agent should have a specific gravity of 4 or more and should be suspendible in an aqueous medium in order to form an aqueous suspension whereby the weighting agent may be circulated down the drill string. The weighting agent also should be of such particle size that the resulting aqueous suspension will form a solid plug by dehydration against a porous zone and/or settling in the presence of the complex phosphate thinning agent.

Exemplary of weighting agents which may be used in carrying out the present invention are barite (barium sulfate) of a specific gravity of approximately 4.2, galena (lead sulfide) of a specific gravity of about 7.4, and hematite (iron oxide) of a specific gravity of approximately 5.0. The preferred weighting agent for use in this invention is barite and the invention will be described specifically with regard to this material. Barite is a well known weighting agent which is commonly available for use in drilling operations. Commercially available barite normally will comprise on the order of about 95 percent barium sulfate with the remainder typically being inert, water-insoluble materials with only trace amounts of water-soluble constituents. It normally will exhibit a specific gravity on the order of about 4.2 or higher and will be ground to a fineness such that about 95 percent or more will pass through a 325 mesh screen and at least 99 percent will pass through a 200 mesh screen.

Thinning agents which may be utilized in carrying out the present invention are the complex phosphates which induce settling of the weighting agent. Suitable complex phosphate thinning agents which are commercially available as mud additives and which may be utilized in the present invention include sodium pyrophosphate, sodium acid pyrophosphate, sodium metaphosphate, sodium hexametaphosphate, sodium tetraphosphate, tetrasodium phosphate, tetrasodium pyrophosphate, sodium tripolyphosphate, sodium septaphosphate, and sodium octophosphate. While these phosphates usually are more readily available in the sodium form, other alkali metal complex phosphates may be used. For example, the potassium or lithium forms of the complex phosphates such as lithium or potassium acid pyrophosphates may be used in the invention. In addition, mixtures of alkali metal and alkaline earth metal and/or zinc complex phosphates, i.e., the so-called "controlled solubility phosphates," may be utilized in carrying out the invention. Also, other suitable complex phosphate thinning agents include complex organo-phosphates such as

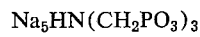

(available commercially under the tradename Dequest 2006) and $H_6N(CH_2PO_3)_3$ (available commercially under the tradename Dequest 2000).

Of the various complex phosphates which may be utilized in carrying out the present invention, sodium acid pyrophosphate, tetrasodium pyrophosphate, sodium metaphosphate, sodium tetraphosphate,

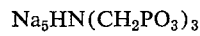

or mixtures thereof, are preferred. These materials are relatively economical, readily available, and function when utilized under the conditions described hereinafter to cause rapid, effective plug formation through settling of the barite from the aqueous suspension.

In the rotary drilling of a well there is employed a drill string which carries on its lower end a drill bit having one or more openings therein for the discharge of drilling fluid from the drill string into the wellbore exteriorly of the drill string. The drill string extends through a rotary table on the floor of the drilling rig and is supported by the rig through means of a drawworks. Typically, the drilling fluid is withdrawn from a "mud pit" at the surface of the well and passed into the drill string via a rotary swivel. The drilling fluid is circulated downwardly through the drill string and outwardly into the wellbore exteriorly of the drill string through the outlet ports in the drill bit. The drilling mud then is circulated to the surface of the well through the annulus between the drill string and the wall of the well. At the surface the mud may be passed to a suitable separation zone where suspended drill cuttings and other solids may be separated and thence the drilling fluid is passed into the mud pit where it may be withdrawn for reintroduction into the drill string.

During normal drilling operations the drilling fluid is circulated downwardly through the drill string and upwardly through the annulus as described above. When it is desired to form a plug in the well, for example, as when a high pressure zone is suspected or encountered or when a lost circulation zone exists above a high pressure zone, the introduction of the drilling fluid into the drill string is temporarily suspended. Thereafter, an aqueous suspension of barite, formulated as described in detail hereinafter, is introduced into the drill string and circulated downwardly through the drill string and into the wellbore externally of the drill string. Such circulation of the aqueous suspension may be accomplished by following the desired amount of barite suspension with the normally used drilling fluid. After the desired amount of barite suspension is introduced into the wellbore the drill string is withdrawn from the aqueous suspension and the suspension allowed to form a pressure-resistant plug.

In order for effective settling of barite to occur within the barite slurry within the well, the viscosity and particularly the yield point of the slurry must be kept to a relatively low level. Accordingly, it is highly desirable that mixing of the slurry with the drilling mud within the well be kept to a minimum and, if possible, avoided altogether. It is desirable, of course, that the barite settle rapidly within the suspension once it is in place within the well. However, care should be taken to avoid settling within the drill string itself so as to cause plugging thereof or settling while the drill string is in place within the suspension which may cause sticking of the drill string.

Turning now to FIGURES 1 and 2, there will be described with reference thereto a preferred technique for locating the barite suspension in the well while avoiding or greatly reducing mud contamination and greatly lessening the possibility of sticking or plugging of the drill string. In each of FIGURES 1 and 2 there is illustrated a well 10 which extends through a lost circulation zone 12 and penetrates into the top of an active or high pressure zone 14. Located within the well is a drill string 16 which is equipped at the lower end thereof with a suitable drill bit (not shown). In accordance with a preferred embodiment of the invention, an aqueous suspension or barite is circulated down the drill string and outwardly through the drill bit into the annulus of the well until the suspension is located as illustrated in FIGURE 1. As will be noted by an examination of FIGURE 1, the aqueous barite suspension 18 has been underdisplaced into the wellbore externally of the drill string. By "underdisplacing" is meant that the barite left in the drill string extends above the column of barite plug located in the annulus externally of the drill string. As is shown in FIGURE 1, the drill string above the barite is filled with drilling mud 20 utilized to circulate the slug downwardly through the drill string and the annulus above the barite slug is filled with drilling mud 21 which was present within the well when the barite slug was introduced into the drill string.

After underdisplacing the barite slug to a position as illustrated in FIGURE 1, the drill string is withdrawn from the well as necessary to move the lower end of the string to a level above the top of the barite slug as shown in FIGURE 2. This desirably is accomplished immediately after the slug is positioned as shown in FIGURE 1 in order to avoid plugging or sticking of the drill pipe. Since, as the drill string is withdrawn, the height of the barite slug within the drill string is greater than the height of the barite slug within the annulus, there will be a positive flow of barite from the drill string into the wellbore as the drill string is withdrawn. This will alleviate premature settling of the barite suspension and in addition will minimize any contamination of the barite suspension with drilling mud within the well. It is preferred in carrying out the invention to underdisplace the barite suspension by an amount of at least 2 barrels. Thus, the amount of barite left in the drill pipe above the top of the suspension in the annulus, indicated by bracket 22, should be at least 2 barrels. Overdisplacing of the barite suspension from the drill pipe is almost certain to cause extensive contamination of the barite suspension with the drilling mud and normally should be avoided.

Figure 3:
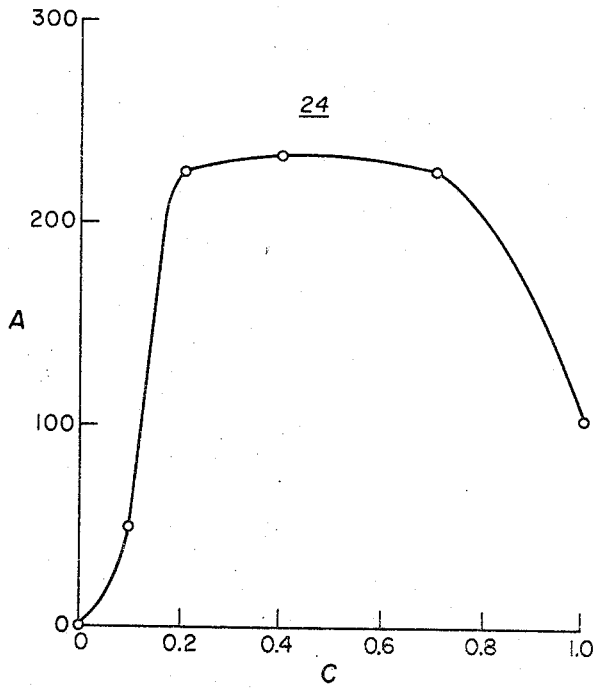
FIGURE 3 is a graph illustrating the effect of complex phosphate thinning agent concentration on the tendency of the weighting agent to settle from suspension.

Turning now to FIGURE 3, there is shown a curve 24 which illustrates the effect of the concentration of complex phosphate thinning agent in the barite slug on the amount of barite settling from suspension within a fifteen minute period. In FIGURE 3 the concentration C of thinning agent in pounds per barrel of mixing water used in forming the suspension is plotted on the abscissa and the amount A in grams of barite settling from a 200 cubic centimeter suspension is plotted on the ordinate.

As can be seen from an examination of curve 24, the maximum amount of barite settled from suspension is obtained when the complex phosphate concentration is within the range of 0.2 to 0.7 pound per barrel. Above 0.7 pound per barrel the tendency of the barite to settle falls off rapidly until at a complex phosphate concentration of one pound per barrel the settling efficiency of the barite is less than half of that obtained when the concentration is within the optimum range. At concentrations of less than 0.2 pound per barrel the barite settling efficiency falls off rapidly and actually reaches zero where the suspension contains no complex phosphate thinning agent.

The barite preferably is present in the aqueous suspension in an amount to produce a suspension exhibiting a density within the range of 18 to 24 pounds per gallon. In experiments carried out in respect of the invention it was found that the filter loss and the tendency of barite to settle were lower for a 22 pounds per gallon suspension than for an 18 pounds per gallon suspension. However, the heavier suspension gives a higher hydrostatic head, produces a larger plug of settled barite for a given volume of suspension, and requires less drill string to be withdrawn in order to place the bit above the barite plug. These advantages more than offset the lower filter loss and barite settling, and, accordingly, it usually is most desirable to operate within the higher end of the 18 to 24 pounds per gallon range. It also has been found that rapid settling of the barite reduces the filter loss by forming filter cake more rapidly. However, the lower filter loss accompanying the settling rates obtained by utilizing the complex phosphate thinning agent within the desired range is more than offset by the improved results obtained due to the high settling rates.

FIGURE 4 illustrates the effect of the pH of the barite suspension on the amount of barite settling from the suspension within a fifteen minute period. In FIGURE 4 curve 26 is a plot of the pH of the barite slurry on the abscissa versus the amount A in grams of barite settling from 200 cubic centimeters of suspension on the ordinate. As can be seen from an examination of FIGURE 4, the most effective barite settling occurs when the pH is within the range of 8 to 10 and it is preferred to operate within this range in carrying out the invention. Above this range the tendency of the barite to settle falls off fairly gradually and below this range the tendency of barite settling falls off quite rapidly until at a pH of 6 no barite settling is observed. While a pH outside of the aforementioned optimum range may be utilized in carrying out the present invention, it is desirable to at least maintain the pH of the barite suspension within the range of 6 to 11.

The experimental data applied in the presentation of curves 24 and 26 in FIGURES 3 and 4, respectively, was obtained utilizing sodium acid pyrophosphate as the thinning agent. However, experimental data obtained for other complex phosphate thinning agents and in particular tetrasodium pyrophosphate, sodium metaphosphate, sodium tetraphosphate, and $Na_5HN(CH_2PO_3)_3$ generally conform with the data presented for sodium acid pyrophosphate and such other complex phosphate thinning agents should be utilized in the amounts and under the pH conditions described above.

It is further preferred in carrying out the present invention that the aqueous medium utilized in forming the barite suspension be a relatively fresh water which exhibits a dissolved salts content of not more than 2,000 p.p.m. In this regard, the amount of barite settled from suspension tends to decrease with increasing salt concentration above this point until at a dissolved salts content of about 35,000 p.p.m. the tendency of the barite to settle is reduced to the point where little or no such settling occurs. While formation of the barite plug through dehydration may be obtained utilizing such high concentration brines, this mechanism is somewhat less reliable in the formation of the plug than the settling mechanism. Therefore, it is preferred in carrying out the invention to form the suspension of an aqueous medium exhibiting a relatively low salts content as noted above.

While barite is the preferred weighting agent utilized in carrying out the present invention, other weighting agents may be used. For example, hematite or galena, referred to previously, may be used where suspensions heavier than the 18 to 24 pounds per gallon densities may be desired. Thus, galena may be used as the weighting agent to form a suspension exhibiting a density within the range of about 32 to 36 pounds. For suspensions exhibiting intermediate densities within the range of 22 to 27 pounds per gallon, hematite may be utilized as the weighting agent. The hematite or galena used should be prepared similarly as described above with regard to the barite. Thus, the barite or hematite or galena normally should be ground to a fineness such that about 95 percent or more will pass through a 325 mesh screen and at least 99 percent through a 200 mesh screen. In addition to the above-noted suspensions, suspensions formed of mixtures of the above-three or other suitable weighting agents may be used.

The amount of aqueous suspension of barite or other weighting agent introduced into the well will depend upon local conditions such as the pressure encountered in the active zone, the distance between the active zone and the lost circulation zone (if such zone is present), the weight of the drilling mud normally used, and the depth to the active zone or the bottom of the well. In most cases it will be preferred to introduce the aqueous suspension in an amount sufficient to introduce at least 75 cubic feet of weighting agent into the well. For normally used bit and drill pipe sizes this will provide a plug within the well of approximately 200 to 450 feet in length. Of course, longer plugs may be formed in accordance with the present invention but it will be recognized that care should be exercised in order to avoid extending the plug up into a lost circulation zone. Also, relatively long plugs usually are not desirable since this increases the distance by which the drill string must be withdrawn from the well in order to clear the bit of the suspension.

Having described specific embodiments of the instant invention, it will be understood that further modifications thereof may be suggested to those skilled in the art, and it is intended to cover all such modifications as fall within the scope of the appended claims.

What is claimed is:

1. In the drilling of a well, the method of placing a plug within said well comprising:

introducing into a drill string within said well an aqueous suspension of a weighting agent containing a water-soluble complex phosphate thinning agent in an amount within the range of 0.2–0.9 pound per barrel of water and having a pH within the range of 6 to 11;

circulating said aqueous suspension down said drill string and into the wellbore externally of said drill string; and thereafter withdrawing said drill string from said aqueous suspension.

2. The method of claim 1 wherein said aqueous suspension has a pH within the range of 8 to 10.

3. The method of claim 1 wherein said thinning agent is present in said suspension in an amount within the range of 0.2–0.7 pound per barrel.

4. The method of claim 1 wherein said weighting agent is barite.

5. The method of claim 4 wherein said aqueous suspension has a density within the range of 18–24 pounds per gallon.

6. The method of claim 4 wherein said aqueous suspension is introduced in an amount sufficient to introduce at least 75 cubic feet of barite into said wellbore.

7. The method of claim 1 wherein said aqueous suspension contains water having a dissolved salts content of not more than 2,000 parts per million.

8. The method of claim 1 wherein said aqueous suspension is underdisplaced from said drill string into said well.

9. The method of claim 8 wherein said aqueous suspension is underdisplaced by an amount of at least two barrels.

10. The method of claim 1 wherein said thinning agent is selected from the class consisting of sodium acid pyrophosphate, sodium metaphosphate, sodium tetraphosphate, tetrasodium pyrophosphate, $Na_5HN(CH_2PO_3)_3$, and mixtures thereof.

11. The method of claim 10 wherein said aqueous suspension has a pH within the range of 8 to 10.

12. The method of claim 10 wherein said thinning agent is present in said suspension in an amount within the range of 0.2–0.7 pound per barrel.

13. The method of claim 10 wherein said aqueous suspension contains water having a dissolved salts content of not more than 2,000 parts per million.

14. The method of claim 13 wherein said weighting agent is barite and said aqueous suspension has a density within the range of 18–24 pounds per gallon.

15. The method of claim 14 wherein said aqueous suspension is introduced in an amount sufficient to introduce at least 75 cubic feet of barite into said wellbore.

16. The method of claim 15 wherein said aqueous suspension is underdisplaced from said drill string into said well by an amount of at least two barrels.

References Cited

UNITED STATES PATENTS

| | | | |
|---|---|---|---|
| 2,294,877 | 9/1942 | Wayne | 252—8.5 |
| 2,335,146 | 11/1943 | Ford et al. | 252—8.5 |
| 2,365,489 | 12/1944 | Partridge | 252—8.5 |
| 2,393,047 | 1/1946 | Krase | 252—8.5 |
| 2,393,173 | 1/1946 | Larsen | 166—292 |
| 2,393,560 | 1/1946 | Partridge | 252—8.5 |
| 2,435,211 | 2/1948 | Gillet | 252—8.5 |
| 2,445,893 | 7/1948 | Tjoflat | 252—8.5 |
| 2,895,911 | 7/1959 | Van Dyke | 252—8.5 |
| 3,318,396 | 5/1967 | Tailleur | 252—8.5 |

STEPHEN J. NOVOSAD, Primary Examiner

U.S. Cl. X.R.

175—65; 252—8.5